(12) United States Patent
Haviland

(10) Patent No.: US 12,247,683 B2
(45) Date of Patent: Mar. 11, 2025

(54) SWIVEL BEARING ASSEMBLY

(71) Applicant: Haviland Holdings Pty Ltd, Knoxfield (AU)

(72) Inventor: Sean Haviland, Knoxfield (AU)

(73) Assignee: HAVILAND HOLDINGS PTY LTD, Knoxfield (AU)

(*) Notice: Subject to any disclaimer, the term of this patent is extended or adjusted under 35 U.S.C. 154(b) by 296 days.

(21) Appl. No.: 17/279,558

(22) PCT Filed: Sep. 16, 2019

(86) PCT No.: PCT/AU2019/000109
§ 371 (c)(1),
(2) Date: Mar. 24, 2021

(87) PCT Pub. No.: WO2020/061608
PCT Pub. Date: Apr. 2, 2020

(65) Prior Publication Data
US 2022/0057030 A1 Feb. 24, 2022

(30) Foreign Application Priority Data
Sep. 27, 2018 (AU) .................................. 2018903653

(51) Int. Cl.
*F16L 27/08* (2006.01)
*A62C 31/24* (2006.01)
*B05B 3/02* (2006.01)

(52) U.S. Cl.
CPC ............ *F16L 27/082* (2013.01); *A62C 31/24* (2013.01); *B05B 3/026* (2013.01); *F16L 27/0861* (2013.01)

(58) Field of Classification Search
CPC .......... F16L 27/082; B05B 3/026; A62C 31/24
(Continued)

(56) References Cited

U.S. PATENT DOCUMENTS 513,167 A * 1/1894 Woodhouse ........... A62C 31/24
239/587.2
2,509,090 A * 5/1950 Faccou ............... F16L 27/0832
285/95
(Continued)

FOREIGN PATENT DOCUMENTS

CN 201028193 Y 2/2008
EP 1469243 A1 * 10/2004 ......... B22D 11/1287
(Continued)

OTHER PUBLICATIONS

ISA Australian Patent Office, International Search Report Issued in Application No. PCT/AU2019/000109, Nov. 11, 2019, WIPO, 4 pages.
(Continued)

*Primary Examiner* — David Bochna
(74) *Attorney, Agent, or Firm* — McCoy Russell LLP

(57) ABSTRACT

A bearing assembly suitable for a fluid delivery system such as a hydraulic water cannon, including for a first pipe that is moveable relative to a second pipe, the assembly comprising a main body adapted to be connected to an end of the first pipe, an annular centre swivel adapted to be connected to an end of the second pipe, the centre swivel including an annular, axially extending boss extending away from the main body, with the opposed radially extending face extending radially outwardly from said boss, and a bearing end cap adapted to engage around the second pipe and be fastened to the main body securing there between said centre swivel. The bearing assembly is adapted to operate at water pressures greater than 10 bar.

22 Claims, 6 Drawing Sheets

(58) Field of Classification Search
USPC .................................................. 285/280, 281
See application file for complete search history.

(56) References Cited

U.S. PATENT DOCUMENTS

| | | | | |
|---|---|---|---|---|
| 2,599,039 | A * | 6/1952 | Baker | E21B 43/127 |
| | | | | 285/281 |
| 2,817,543 | A * | 12/1957 | Corsette | F16L 27/0824 |
| | | | | 285/98 |
| 2,833,566 | A * | 5/1958 | Meyer | F16L 27/0832 |
| | | | | 285/379 |
| 2,833,568 | A * | 5/1958 | Corsette | F16L 27/0832 |
| | | | | 285/353 |
| 2,986,344 | A * | 5/1961 | Knight | F16L 27/0812 |
| | | | | 285/280 |
| 3,645,590 | A * | 2/1972 | Bird | F16C 32/0618 |
| | | | | 384/113 |
| 3,724,877 | A * | 4/1973 | Thut | F16L 27/0832 |
| | | | | 285/55 |
| 4,229,024 | A * | 10/1980 | Oberrecht | F16L 27/0845 |
| | | | | 285/422 |
| 4,478,438 | A * | 10/1984 | Elorriaga, Jr. | F16L 27/0812 |
| | | | | 285/94 |
| 5,169,181 | A | 12/1992 | Timm et al. | |
| 6,003,907 | A * | 12/1999 | Gau | F16L 27/0824 |
| | | | | 384/514 |
| 6,007,105 | A | 12/1999 | Dietle et al. | |
| 6,053,539 | A * | 4/2000 | Bravo | F16L 27/0865 |
| | | | | 285/39 |
| 6,086,112 | A | 7/2000 | Schofield et al. | |
| 6,508,492 | B2 * | 1/2003 | Nixon | F16L 27/0812 |
| | | | | 285/280 |
| 6,655,613 | B1 * | 12/2003 | Brown | B05B 15/652 |
| | | | | 169/24 |
| 6,811,188 | B2 * | 11/2004 | Haviland | F16L 27/08 |
| | | | | 285/272 |
| 8,714,598 | B2 * | 5/2014 | Bohner | F16L 27/0828 |
| | | | | 285/98 |
| 10,072,780 | B2 * | 9/2018 | Prahl | F16L 27/0845 |
| 2004/0051312 | A1 | 3/2004 | Haviland | |
| 2004/0216902 | A1 * | 11/2004 | Trapp | A62C 31/24 |
| | | | | 169/52 |
| 2004/0232692 | A1 | 11/2004 | Lawson | |
| 2005/0167122 | A1 * | 8/2005 | Trapp | A62C 27/00 |
| | | | | 169/24 |
| 2011/0042936 | A1 * | 2/2011 | Andrews | F16L 27/0832 |
| | | | | 285/94 |

FOREIGN PATENT DOCUMENTS

| | | |
|---|---|---|
| EP | 3460170 A1 | 3/2019 |
| FR | 3110445 A1 * | 11/2021 |
| GB | 2516711 A | 2/2015 |
| JP | H08253925 A | 10/1996 |
| WO | 0212771 A1 | 2/2002 |
| WO | WO-2022251957 A1 * | 12/2022 |

OTHER PUBLICATIONS

ISA Australian Patent Office, Written Opinion of the International Searching Authority Issued in Application No. PCT/AU2019/000109, Nov. 11, 2019, WIPO, 4 pages.

* cited by examiner

SWIVEL BEARING ASSEMBLY

CROSS REFERENCE TO RELATED APPLICATIONS

The present application is a U.S. National Phase of International Application No. PCT/AU2019/000109 entitled "SWIVEL BEARING ASSEMBLY," and filed on Sep. 16, 2019. International Application No. PCT/AU2019/000109 claims priority to Australian Patent Application No. 2018903653 filed on Sep. 27, 2018. The entire contents of each of the above-listed applications are hereby incorporated by reference for all purposes.

TECHNICAL FIELD

The present invention relates to the field of fluid delivery systems.

In one form, the invention relates to a swivel bearing for a fluid delivery system.

In one particular aspect, the present invention is suitable for use as swivel bearing for a system and/or water davit arm for allowing pivot adjustable delivery of water at high pressure to a locus comprising a water canon for delivery of water at high pressure to a locus.

It will be convenient to hereinafter describe the invention in relation to firefighting, however it should be appreciated that the present invention is not so limited and can be used in a wide variety of applications.

BACKGROUND AND SUMMARY

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Water cannons are used for delivery of water to a locus in a wide range of industries. For example, water cannons are used in firefighting to smother fire, in mines or construction sites to suppress dust, in industry to wash large vehicles and in hydraulic mining to dislodge rock material or move sediment for production purpose.

Water cannons differ from similar devices in terms of the volume of water delivered, the nozzle speed and pressure of water delivery. Typically, water cannons are part of a portable system and are often mounted to a vehicle. Movement of the nozzle is usually effected by pneumatic, electric or hydraulic power sources.

The water cannon is part of a system that comprises a conduit formed of multiple pipes, the conduit having a first end connected to a supply of water and a second end terminating in a nozzle. It is important that the second end is moveable so that the nozzle may be directed in any desired direction. The movement of pipes and other parts of the conduit relative to one another requires the use of one or more fluid tight swivel bearings.

Conventional bearing systems of the prior art for use in swivels are described for example, in Japanese patent application 99556205 (Okano Valve Seizo KK) which relates to a swivel joint and Chinese patent application 2010281934 (Shenzhen Longgang Ailian Universe Machine Equipment Factory) which relates to a high-pressure rotating joint and adapter connector. Typically, prior art bearing seals utilise variations of known arrangements such as conventional roller bearings, snap rings, ball bearings and race screw thread, gasket seals, devices that use multi-chamber fluid/gas transfer internally within the swivel, grub screws, retention pins or similar, and soforth.

In another example, European patent application 2018196468 (OneSubsea IP UK Ltd) discloses a bearing system that uses a plurality of rings and a plurality of seals to achieve sealing faces and express a fluid pressure on both sides of the seals and pressurised axial face seal system.

The fluid type bearings typically include radially extending bearing surfaces incorporating needle, roller or ball bearings. Axially extending sealing surfaces typically include one or more seals such as O-rings or other sealing material known in the art for sealing between relatively movable, radially spaced, axially extending cylindrical surfaces.

It is important that the seals not only keep the bearing fluid-tight but also provide stability and permit swivelling movement. This is straightforward at lower water pressures of about 7 to 10 bar (102 to 145 psi), but resistance to the swivelling motion increases as the water pressure rises. Higher water pressures tends to cause distortion of the components, particularly sealing material in the bearing assemblies, and restricts nozzle movement.

For these reasons, bearing systems of the prior art are not operated with water pressures of greater than about 25 bar (363 psi) because it is too difficult to rotate the nozzle about the bearing.

There is therefore a need for a bearing that can be used with higher water pressure.

An object of the present invention is to provide an improved fluid delivery system, such as a high pressure water delivery system.

A further object is to provide a high pressure water delivery system that can be fitted to any appropriate fixed or mobile locus, including vehicles.

A further object is to provide a water delivery system that is capable of operation at high pressure and can be fitted to a vehicle during manufacture, or retrofitted.

A further object of the present invention is to alleviate at least one disadvantage associated with the related art.

It is an object of the embodiments described herein to overcome or alleviate at least one of the above noted drawbacks of related art systems or at least provide a useful alternative to related art systems.

In a first aspect of embodiments described herein there is provided a bearing assembly for a first pipe that is moveable relative to a second pipe in a fluid delivery system, the assembly comprising;

a main body adapted to be connected to an end of the first pipe, the main body having a first coaxial transverse recess to receive the annular first seal, and a radially extending annular face having a coaxial seat on the annular face to receive a first annular bearing, an annular centre swivel adapted to be connected to an end of the second pipe and having a first radially extending face including a coaxial seat to engage the first annular bearing and a second coaxial seat on an opposite radially extending face to receive the second annular bearing, the centre swivel further including an annular, axially extending boss extending away from the main body, with the opposed radially extending face extending radially outwardly from said boss, and a bearing end cap adapted to engage around the second pipe and be fastened to the main body securing there between said centre swivel and bearings, the end cap having a seat for the second bearing.

Typically, the first seal member comprises an annular glide seal and an O-ring energiser. Preferably the first annular seal is at least partly fabricated from polytetrafluoroethylene (PTFE) based material or other polymer of suitably high abrasion resistance, dimensional stability and low friction.

Typically the first annular bearing and the second annular bearing comprises a thrust ring, and are formed of a bearing material such as phosphor bronze, but more preferably of a material that is graphite impregnated.

The bearing assembly of the present invention is capable of operating at water pressures greater than 10 bar, such as greater than 20 bar, preferably greater than 40 bar and more preferably greater than 70 bar.

Aspects of the present invention is not restricted by physical diameter in its functionality of delivering fluid through a sealed bearing to permit coaxial directional movement at high pressure without leaking or seizing. Current design tested swivel bearings range in diameter from 1.5" thru to 10" nominal bore size; with the capability for infinite diameter when using the same functional design criteria.

In one particular aspect, the present invention is suitable for use as swivel bearing for a system comprising a water davit arm for allowing pivot adjustable delivery of water at high pressure to a locus.

Typically the centre swivel boss extends through the opening in the end cap and is closely spaced therefrom. The boss provides rigidity for the centre swivel to secure the second pipe section.

The centre swivel boss that extends through the End Cap interfaces a Dust Seal to prevent migration of dust, moisture and general contaminants.

In one form of the invention, the outer surface of the main body has gear teeth by which the body and associated first pipe section can be rotated about the axis of the bearing relative to the swivel section and the second pipe section.

In an alternative form of the invention, the inner geared surface operates via a worm and wheel seal design by which the body and associated first pipe section can be rotated about the axis of the bearing relative to the swivel section and the second pipe section.

In a preferred form of the invention, the end cap is secured to the main body by axially extending bolts. The main body may be secured to the first pipe by welding or the like or by use of a screw thread formed in the main body and on the end of the pipe section. Locking means may be used to securely lock the body to the pipe section.

Similarly, in a preferred form of the invention, the centre swivel is secured to the second pipe by welding or the like or by the use of cooperating screw threads with an appropriate locking means such as lock nuts.

Preferably, the dust seal is an O-ring that acts to keep the internal end of the bearing relatively sealed from contaminants. The end cap is provided with a dust seal slot in an inner cylindrical surface that is adjacent the surface of the second pipe to minimise the ingress of foreign matter.

The bearing assembly of the present invention provides a rigid yet easily rotatable bearing structure for two pipes, which may form part of a system associated with a water cannon or the like. Such devices are commonly mounted on the chassis of vehicles and, are subject to substantial vibration and lateral and bending forces which are concentrated at the bearing connection between the pipes. Typical devices of the prior art are only rotatable up to about 20 bar water pressure. The bearing assembly arrangement of the present invention, provides the necessary rigidity and stability for a cannon system while still permitting movement of the centre swivel at water pressures well above 20 bar.

In a second aspect of the present invention there is provided a hydraulic water cannon comprising:

a water inlet pipe adapted to be connected to a water supply, a bearing assembly as herein described in the first aspect of embodiments, having the boss of the swivel section connected to the inlet pipe, an intermediate pipe connected to the main body of the bearing assembly, the intermediate pipe section having a right angle elbow, a second bearing assembly having the boss of the swivel section connected to the intermediate pipe, an outlet pipe connected to the main body of the second bearing assembly and having a reversely turned elbow to which an angled water outlet nozzle is connected, the first bearing assembly having a first actuator, preferably an electric or hydraulic actuator, to move the main body relative to the inlet pipe, a second actuator to move the main body of the second bearing assembly relative to the intermediate pipe, and a hydraulic fluid delivery system including at least one electrically driven hydraulic pump connected to the hydraulic actuators.

In another aspect of embodiments described herein there is provided a hydraulic water cannon kit adapted to be mounted at any desired fixed or mobile location, such as a vehicle cabin. The system of the invention may draw power from any convenient electrical supply, such as a vehicle electrical supply and includes electrically driven hydraulic pumps to supply hydraulic motors that control the system, including rotation of the pipe work.

The water cannon, Davit Arm or similar equipment, is typically supplied with water from a storage system using pumps to develop the necessary head of pressure. Preferably, two bearing assemblies are incorporated into the water cannon pipe system so that the water cannon nozzle can be moved in both the horizontal and vertical planes via manual means by way of a handle or via hydraulic, electric or pneumatic actuators motors are typically associated with each bearing so that the appropriate pipe of the conduit can be rotated relative to the other pipes of the conduit to produce the necessary movement of the nozzle. Alternatively, hydraulic cylinders may be used in place of hydraulic motors where the angle of movement is limited.

An electric, hydraulic or pneumatic joystick control may be provided at an appropriate location, such as in a vehicle cabin, for control of the movement of the water cannon nozzle.

In a yet another aspect of embodiments described herein there is provided a fluid delivery system comprising the bearing assembly herein described.

Other aspects and preferred forms are disclosed in the specification and/or defined in the appended claims, forming a part of the description of the invention.

In fluid delivery systems of the prior art, force exerted by water at high pressure in a conduit has deformed components of associated swivel bearing assemblies and hindered or prevented their swivel movement. In essence, embodiments of the present invention stem from the realization that by redesign of the seals in a bearing and use of thrust element and elastic energising element, the swivel bearing assembly can continue to swivel at water pressures greater than 20 bar, preferably greater than 40 bar, or more preferably greater than 70 bar.

Advantages provided by the swivel bearing of the present invention comprise the following:
 for a given value of water pressure, the force required to pivot or swivel is less than that of prior art arrangements,
 can be retro-fitted to existing devices,
 relatively simple construction,
 improved operation of the swivel and movement of the assembly above 20 bar, such as at 40 or 70 bar, and/or
 little, if any, significant increase in manufacture cost as compared with the prior art.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

Figure 1A:
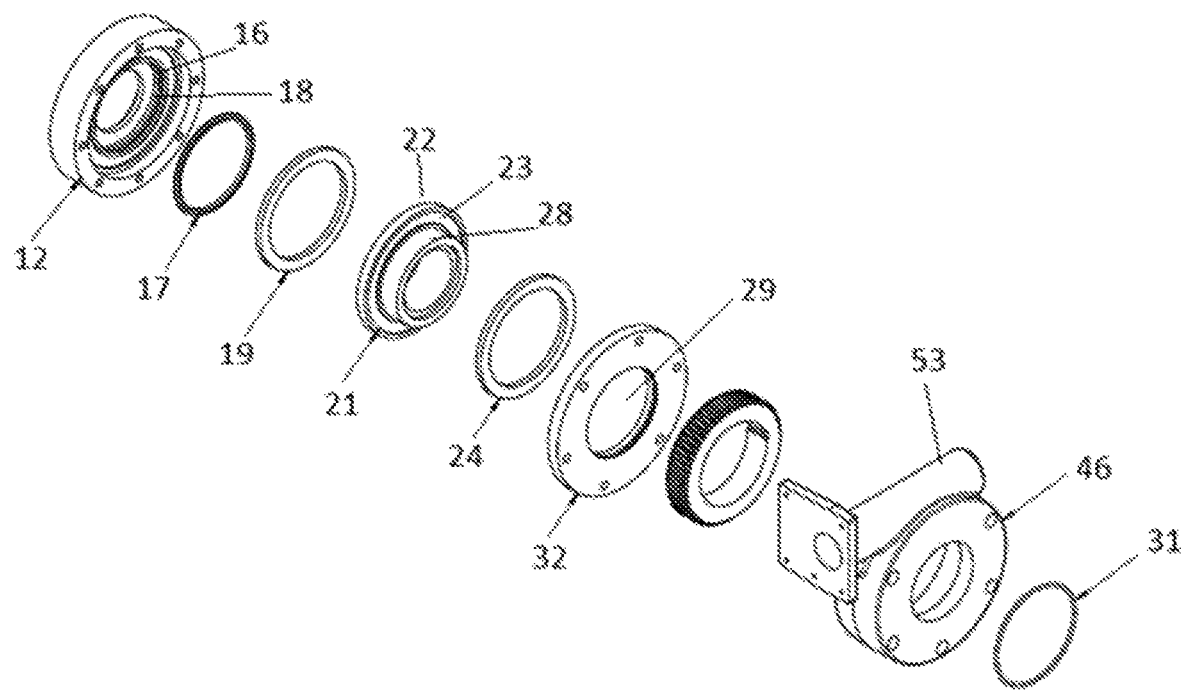
FIG. 1A is an expanded perspective view of the elements of a worm drive embodiment and comprising the swivel bearing assembly of the present invention with a second bearing assembly, for context.
Figure 1B:
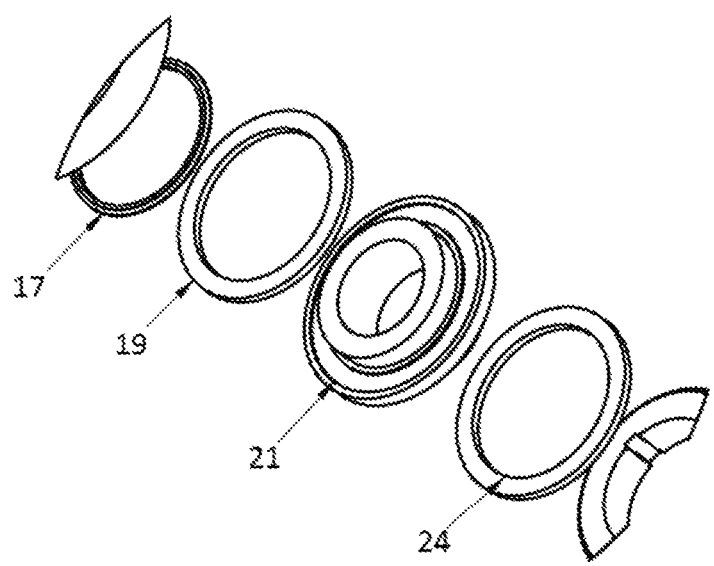
FIG. 1B is an expanded view of the seal arrangement according to the present invention.

| List of Parts Shown in the Drawings | | | |
|---|---|---|---|
| 12 | main body | 17 | first annular seal (comprising an annular glide seal 17a and O-ring energiser 17b) |
| 16 | coaxial seat on inner radial face of body 12 | 19 | first annular bearing (e.g. graphite thrust ring) |
| 18 | coaxial transverse recess in the body 12 | 21 | centre swivel |
| 22 | coaxial seat (on a first radial face of the centre swivel 21) | 23 | coaxial seat (on the opposed radial face of the centre swivel 21) |
| 24 | second annular bearing (eg graphite thrust member) | 29 | circular opening (in the end cap 32) |
| 28 | axially extending boss (of centre swivel 21) | 31 | dust seal |
| 30 | first bearing assembly | 33 | outer cylindrical surface (of the boss 28) |
| 32 | bearing end cap | 35 | coaxial seat (of end cap) |
| 36 | pipe section | 37 | control valve |
| 38 | actuator (for valve 37) | 39 | housing (on pipe section 36, for first bearing assembly 30) |
| 40 | hydraulic motor | 41 | second pipe section |
| 42 | third pipe | 47 | water cannon nozzle |
| 44 | joystick control | 49 | housing of hydraulic power pack hydraulic tank |
| 46 | second bearing assembly | | |
| 48 | hydraulic cylinder | 51 | electric motors powerpack pump/motors |
| 50 | plate | | |
| 52 | hydraulic lines | | |

DETAILED DESCRIPTION

FIG. 1A illustrates in detail the preferred components for a swivel bearing assembly in a fluid supply system, such as in a water cannon or similar apparatus. The bearing assembly has a main body 12 that is adapted to be connected, as by welding, to one end of one of the pipe sections. It will be appreciated that the main body 12 may be secured to the pipe section by a screw thread, adhesive or any other suitable connecting means.

The arrangement shown differs from sealing systems of the prior art such as the system disclosed and taught in European patent application 2018196468 (One Subsea) which uses a plurality of rings and a plurality of seals to achieve sealing faces and express a fluid pressure on both sides of the seal and pressurised axial face seal system. The sealing system of the prior art differs principally by providing single sealing with an "energised" O-ring.

The body 12 may include gear teeth (not shown in this illustration) on its outer surface by which the body 12 and the connected pipe is able to be rotated about its axis. On an inner radial face, the body 12 has a coaxial recess 18 which is adapted to receive an annular first seal 17 comprising an annular glide seal 17a adapted to abut a rotating body and an O-ring energiser 17b (also illustrated in FIG. 3D). The glide seal 17a may, for example, be made of a polytetrafluoroethylene (PTFE) based material or other polymer of suitably high abrasion resistance, dimensional stability and low friction and maybe provided with (or without) grooves and/or other profile(s) to facilitate contact with centre swivel 21. FIG. 3D shows more detail. The body 12 further includes a radially extending annular face having a coaxial seat 16 which is adapted to receive a first annular bearing 19. The first annular bearing 19 may comprise, for example a graphite thrust ring.

The bearing assembly includes a centre swivel 21 that is adapted to be secured to one end of a second relatively moveable pipe. Again, the centre swivel may be secured to the pipe by welding, a screw thread, adhesive or any other suitable connection means.

The centre swivel 21 has a first radially extending face with a coaxial seat 22 to engage with the first bearing member 19. When the swivel bearing of the present invention is assembled, the main first seal member 17 is interfaced in effect squeezed between the main body 12 and the centre swivel 21 and supported by the energiser O Ring under increasing opposing fluid pressures. A similar coaxial seat 23 is formed on an opposed radial face of the centre swivel 21 to receive a second annular bearing member 24. A bearing end cap 32 is mounted coaxially with the centre swivel 21 and main body 12 and is secured to the body 12 by bolts or similar securing means. The bearing end cap 32 is formed on a radial face 34 with a co-axial seat 35 that, in use, engages with the second annular bearing member 24.

The centre swivel 21 is formed with an axially extending boss 28 which engages through a coaxial, circular opening 29 in the end cap 32. A dust seal O-ring 31 may be used to seal against the outer cylindrical surface 33 of the boss 28.

The first and second bearing members 19 and 24 are formed of a bearing material such as phosphor bronze, but more preferably of a material that is graphite impregnated. The first bearing member 19 and second bearing member 24 act as thrust rings for the bearing assembly and permit relative rotational movement between the centre swivel 21 and the main body 12 and connected end cap 32. The structure of the centre swivel 21 with the integral boss 28 provides a substantially rigid centre swivel that resists deformation in use and provides stability to the bearing assembly, particularly when the assembly is used in environments subject to severe vibration and lateral forces applied to the respective pipes.

The second bearing member 24 is preferably formed as a split thrust ring to facilitate replacement without the need to disassemble the pipe section normally connected to the centre swivel section 21.

Figure 2:
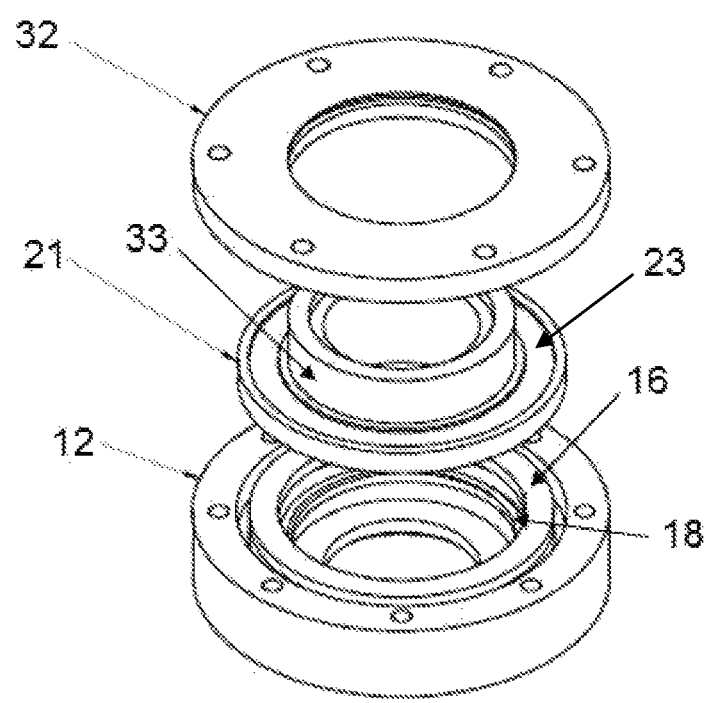
FIG. 2 is a simplified expanded perspective view of the bearing assembly of FIG. 1 without the seals or the second bearing assembly.

FIG. 2 is an expanded perspective view of the bearing assembly of FIG. 1A which is simplified by omission of the seals (17, 19, 24, 31) or the second bearing assembly. FIG. 2 illustrates outer cylindrical surface 33 and coaxial seats 16 and 23 relative to the swivel assembly.

Figure 3A:
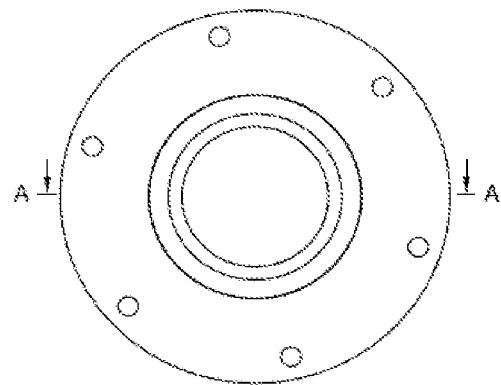
FIGS. 3A-3D are a cross sectional view (FIG. 3B) across AA (FIG. 3A) with enlarged cross sectional detail (FIG. 3C) of portion B and an enlarged sectional detail (FIG. 3D) of portion C.
Figure 3B:
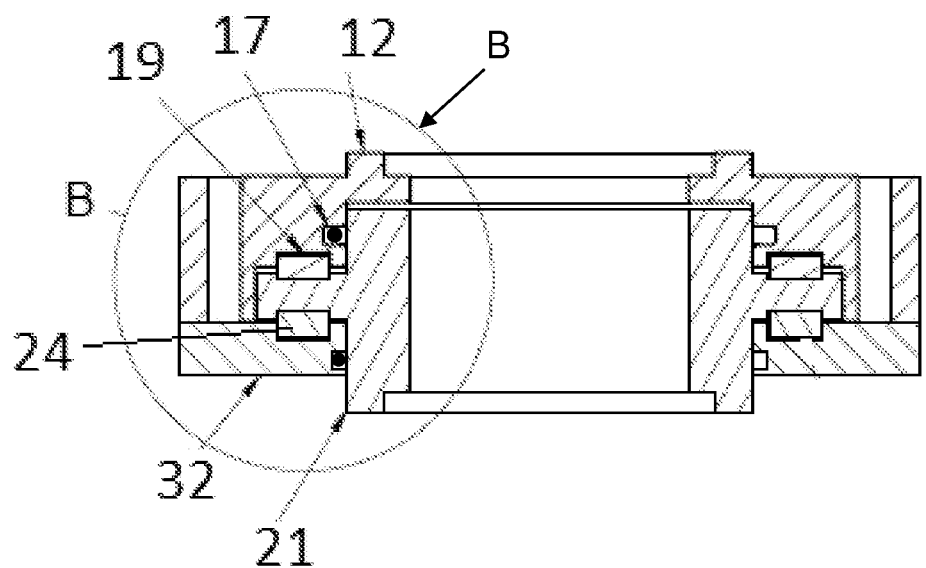
Figure 3C:
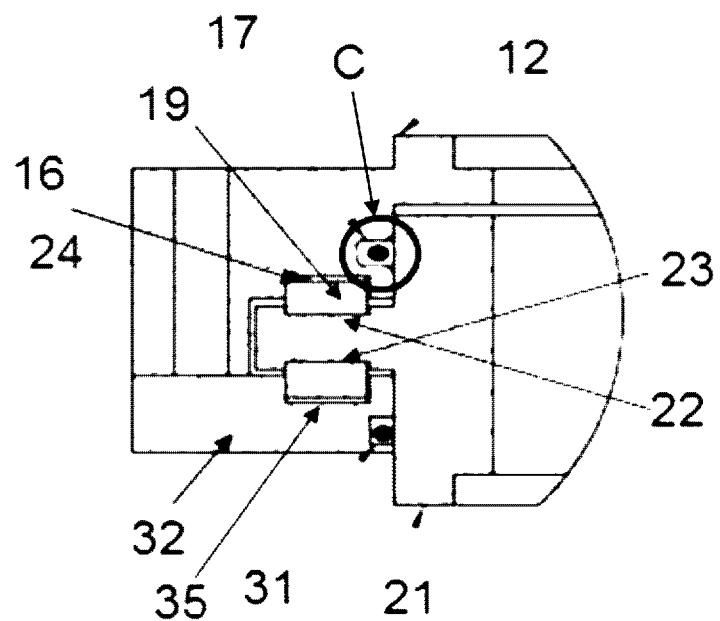
Figure 3D:
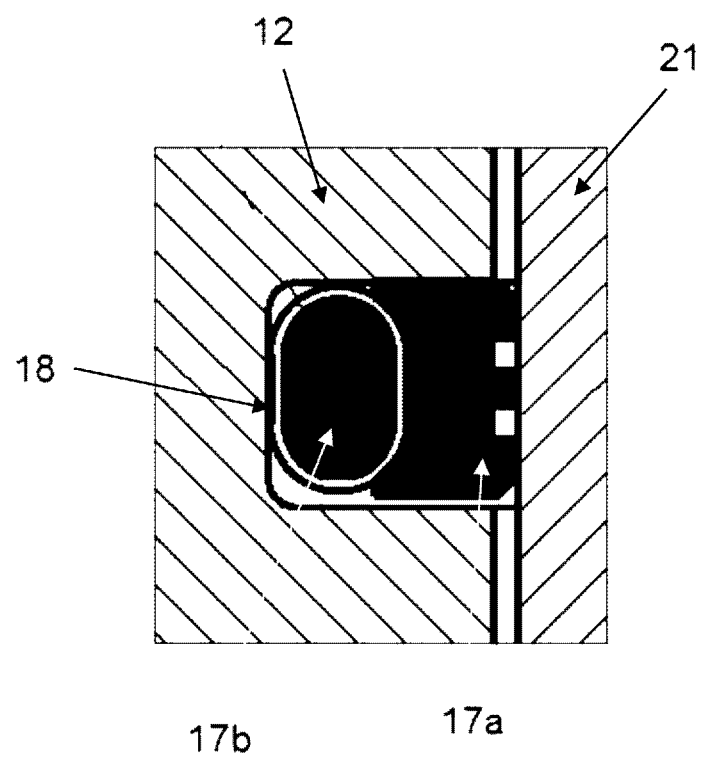

FIG. 3A illustrates one end of the assembly of the present invention. FIG. 3B illustrates a cross sectional view across AA (FIG. 3A) with enlarged cross sectional detail (FIG. 3C) of portion B and FIG. 3D illustrates a more detailed view of portion C of FIG. 3C. In these views it can be seen how the first annular bearing 19 is sandwiched between the main body 12 and the annular centre swivel 21, while the second annular bearing 24 is sandwiched between the annular centre swivel 21 and the bearing end cap 32. FIG. 3D illustrates the glide seal 17a abutting the centre swivel 21 and the O-ring 17b sitting in recess 18 of main body 12. The ribbed profile of glide seal 17a is merely optional. In use, depending on the application, fluid and/or pressure to which the present invention, various shapes, profiles and/or composition of glide seal and/or O-ring energiser can be used.

Figure 4:
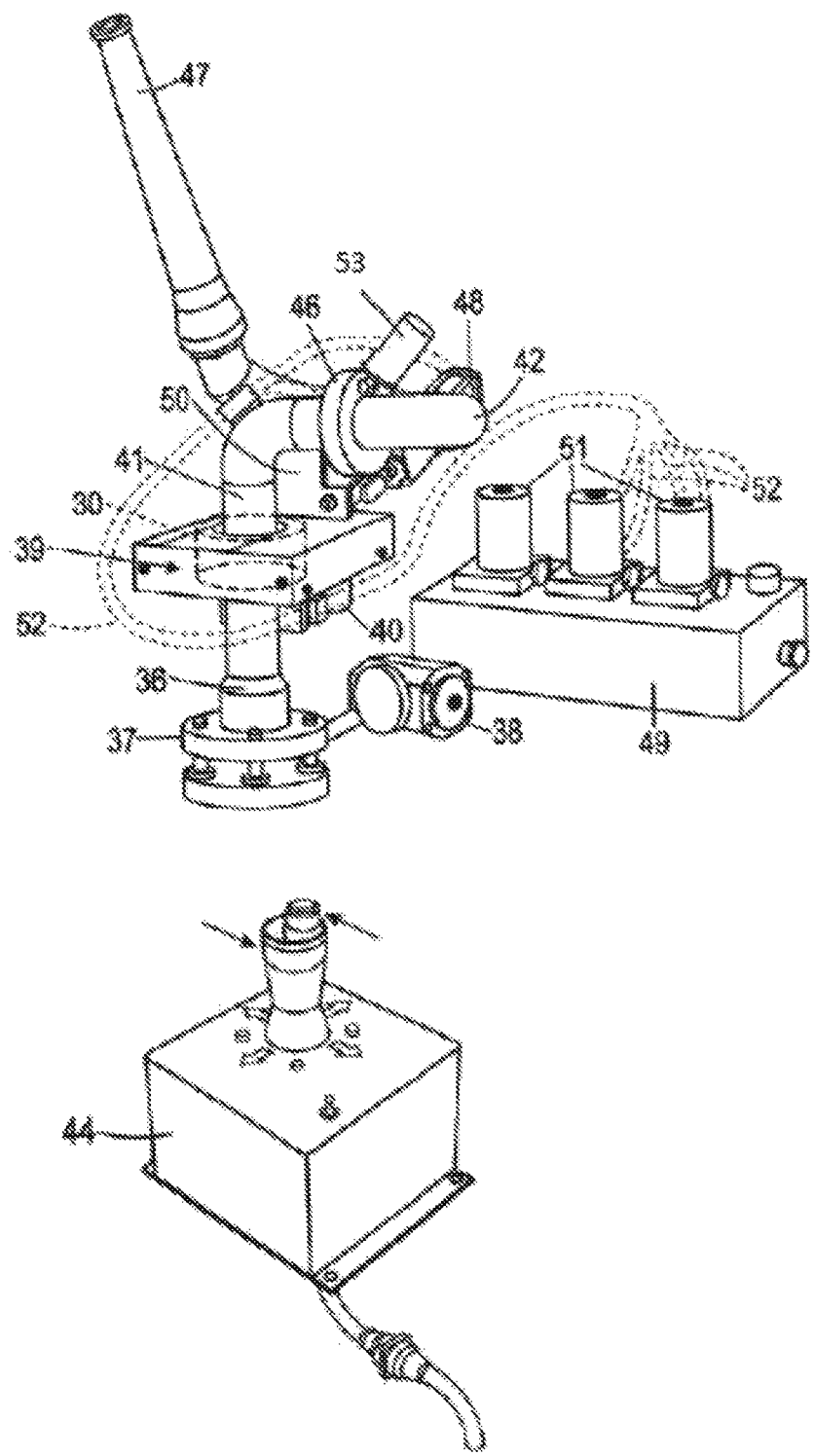
FIG. 4 is a schematic illustration of a water cannon system with an external pinion domain gear drive embodiment and comprising a bearing assembly according to an embodiment of the present invention.

FIG. 4 illustrates a water cannon utilising bearing assemblies of FIG. 1A. The water cannon is adapted to be mounted, for example on the roof cabin of a truck for use as firefighting equipment, dust laying apparatus, agricultural purposes or the like.

The water cannon includes a first substantially vertical pipe section 36 which is adapted to receive water from an appropriate storage by means of pumps (not shown). At the base of the water cannon is a water isolation control butterfly valve 37 with pneumatic, electric or hydraulic actuator 38. A housing 39 mounted on the pipe section 36 surrounds a first bearing assembly 30 and a pinion drive (not shown) on a hydraulic motor 40. The pinion on the hydraulic motor 40 engages with the drive teeth on the body of the first bearing assembly 30.

With the arrangement illustrated, the body 12 of the bearing assembly 30 is secured to the second pipe section 41 while the hydraulic motor 40 and housing 39 are connected to the vertically extending, first pipe section 36. Operation of the hydraulic motor 40 thereby causes the main body 12 incorporating the drive gear teeth, attached second pipe section 41 and attached components to be able to rotate about the axis of the first pipe section 36 in a 360° arc limited only by the arrangement of connecting hydraulic lines 52.

A second bearing 46 without gear teeth is mounted on a substantially horizontally extending part of the second pipe 41 and connects this to a third pipe 42 reversely turned and leading to the water cannon nozzle 47. The second bearing assembly 46 is disposed between the second and third pipes 41 and 42 to facilitate relative rotational movement between the two pipes an whereby the water cannon can be moved in a vertical plane. A hydraulic cylinder 48 is connected between a plate 50 attached to the second pipe 41 and the third pipe 42 whereby the third pipe 42 and associated nozzle 47 is able to rotate about the horizontal axis through the second bearing assembly 46 in an arc of up to maximum 90 degrees when linear actuation 270°, depending on the desired function of the cannon 47. A 360° movement may be provided if necessary for any particular application and may include mechanical actuation of worm drive or even manual control.

The bearing assemblies 30 and 46 are each provided with automatic lubrication systems which lubrication injectors (not shown) mounted in a cylindrical housing adjacent the bearing end cap 32 or the main body 12. The lubrication injectors provide an automatic, periodic injection of lubricant into the bearing assembly to lubricate the respective bearing members. Such lubrication injectors may be manually actuated or actuated automatically by a timer. In the structure illustrated, the water cannon may be controlled by an electric joystick control 44 mounted in a vehicle cabin or at any other location.

Water cannon of this type are commonly connected to the hydraulic systems of a motor vehicle and the vehicle operating systems must be functioning to enable the water cannon to operate. However, this arrangement may be relatively expensive in terms of service cost, down time during maintenance of the cannon and potential contamination to the vehicle hydraulic system oil. It is therefore a feature of the embodiment described that the water cannon system is self-contained and requires only vehicle electrical power to operate the cannon. For this purpose, a hydraulic "power pack" 49 comprises at least one, preferably several electric motors 51 which drive one or more hydraulic pumps located within the housing of the power pack 49. The hydraulic pumps provide hydraulic fluid via the hydraulic lines 52 to the hydraulic motor 40, the hydraulic cylinder 48, and possibly the control valve actuator 38, although the actuator may be controlled by vehicle pneumatics or electrics.

By providing the control system for the water cannon as a kit, the system can be retrofitted to any vehicle without the need for using vehicle hydraulic systems or vehicle pneumatic systems. This system can therefore be moved from vehicle to vehicle if necessary.

Experimental

The present invention will now be further described with reference to the following non-limiting example.

Figure 5:
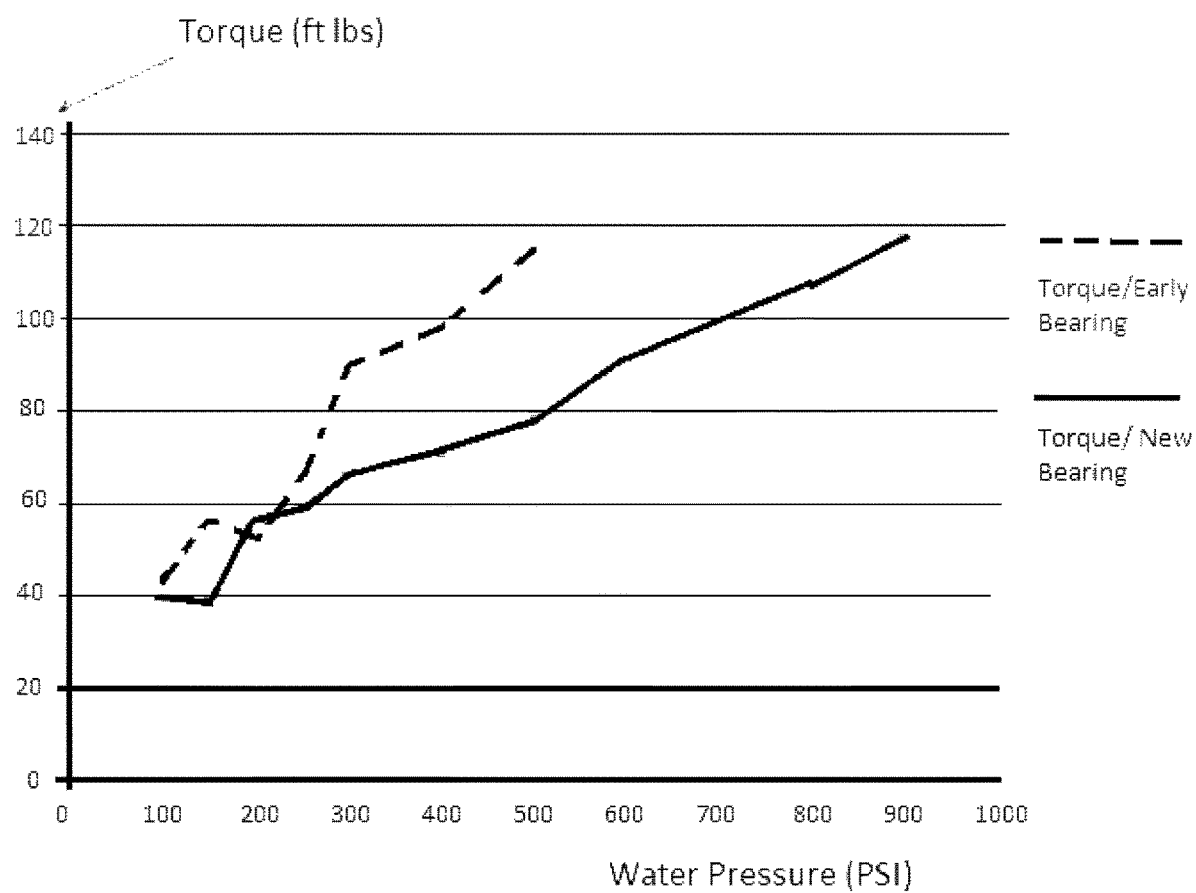
FIG. 5 is a plot of torque (ft lbs) against water pressure in PSI for experimental pressure testing of swivel bearings of the present invention compared with a swivel bearing of the prior art as described in International patent application WO 02/12771 (corresponding to Australian patent application 2001279494).

A 2.5 inch diameter swivel bearing of the present invention was pressure tested and the results compared with a 2.5 inch diameter swivel bearing of the prior art as described in International patent application WO 02/12771 (corresponding to Australian patent application 2001279494). The results are illustrated in FIG. 5 that is a plot of torque (ft lbs) against water pressure (psi).

The pressure testing commenced at 5 Bar and continued with incremental pressure increases of 2.5 Bar until reaching 30 Bar. This is the testing limit for the prior art swivel bearing which, at 30 Bar became forcibly locked by internal pressure, thus preventing manual movement.

By contrast, at 30 Bar the swivel bearings of the present invention could still be moved manually. The testing was continued on the swivel bearing of the present invention with pressure increments of 5 Bar. The testing limit for the present invention was 75 Bar.

As illustrated by the plot, the prior art swivel bearing was only operable to a water pressure of 500 psi whereas the swivel bearing of the present invention was operable to 900 psi.

Table 1 sets out the results in terms of force required (kg) for up and down movement against the water pressure (psi).

TABLE 1

Testing results-2.5 inch diameter swivel bearings

| Water Pressure (psi) | Prior Art | | Present invention | |
|---|---|---|---|---|
| | Down movement (kg) | Up movement (kg) | Down movement (kg) | Up movement (kg) |
| 100 | 9.35 | 10.3 | 8.4 | 3.9 |
| 150 | 12 | 14 | 8.3 | 4.4 |
| 200 | 11.3 | 11.05 | 11.9 | 7.9 |
| 250 | 14.2 | 13.8 | 12.6 | 9.1 |
| 300 | 19 | 15.2 | 14.2 | 10.3 |
| 400 | 21 | 17 | 15.2 | 12.4 |
| 500 | 24.5 | 20.9 | 16.7 | 13.2 |
| 600 | | | 19.5 | 16.2 |
| 800 | | | 23. | 21 |
| 900 | | | 25.1 | 24 |

For purposes of description herein, the terms "upper," "lower," "right," "left," "rear," "front," "vertical," "horizontal," "interior," "exterior," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

The term "comprises" or "comprising" and "includes" or "including" when used in this specification is/are taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A bearing assembly for a first pipe that is moveable relative to a second pipe in a fluid delivery system, the bearing assembly comprising:

a unitary main body adapted to be connected to an end of the first pipe, the main body having a central opening for flow of fluid there-through in the fluid delivery system, a central recess formed having a shoulder or flange surrounding the central opening, and a radially extending annular face formed around the central recess having a coaxial seat on the annular face that receives a first thrust ring;

an annular centre swivel adapted to be connected to an end of the second pipe and having a first radially extending face with a coaxial seat to engage the first thrust ring and an opposite radially extending face with a second coaxial seat that receives a second thrust ring, wherein the centre swivel includes: a part that extends axially towards the main body and is received within the central recess of the main body in axial alignment with the central opening for flow of fluid there-through, wherein an end of said part of the centre swivel received within the central recess is located opposite the shoulder or flange surrounding the central opening, and an annular, axially extending boss that extends away from the main body for connection to the end of the second pipe, with said opposite radially extending face extending radially outwardly from the boss; and a bearing end cap adapted to engage around the second pipe and adapted to be bolted to the main body securing there-between the centre swivel and the first and second thrust rings, the end cap having a seat for the second annular bearing;

wherein the main body has an annular slot forming a first coaxial transverse recess to receive an annular first seal member arranged to seal against a cylindrical outer surface of said part of the centre swivel that extends axially towards the main body and is received within the central recess, and wherein the annular first seal member comprises: a glide seal which abuts the cylindrical outer surface of said part of the centre swivel that extends axially towards the main body, and an O-ring energiser that sits in the annular slot covered by the glide seal.

2. The bearing assembly according to claim 1, wherein said part of the centre swivel within the central recess has an internal diameter that substantially matches a diameter of the central opening in the main body, and wherein the bearing assembly operates at water pressures greater than 10 bar.

3. The bearing assembly according to claim 2, wherein the operating water pressure is greater than 40 bar.

4. The bearing assembly according to claim 3, wherein the operating water pressure is greater than 70 bar.

5. A fluid delivery system comprising the bearing assembly as claimed in claim 1.

6. A system comprising a davit arm assembly and a bearing assembly as claimed in claim 1.

7. The bearing assembly according to claim 1, wherein each of the first and second thrust rings is formed of phosphor bronze.

8. The bearing assembly according to claim 1, wherein each of the first and second thrust rings is graphite impregnated.

9. The bearing assembly according to claim 1, wherein the cylindrical outer surface of the part of the centre swivel extends axially towards the main body from the first radially extending face.

10. The bearing assembly according to claim 1, wherein the cylindrical outer surface of the part of the centre swivel extends coaxially with, and radially inward of, the annular face of the main body.

11. The bearing assembly according to claim 1, wherein the part of the centre swivel that extends axially towards the main body and the annular axially extending boss together define a passage through the centre swivel that communicates with a central opening in the main body for flow of fluid there-through in the fluid delivery system.

12. A hydraulic water cannon comprising:
a water inlet pipe adapted to be connected to a water supply,
a first bearing assembly, being a bearing assembly according to claim 1, wherein the boss of the centre swivel of the first bearing assembly is connected to the inlet pipe,
an intermediate pipe connected to the main body of the bearing assembly, the intermediate pipe section having a right angle elbow,
a second bearing assembly, being another bearing assembly according to claim 1, wherein the boss of the centre swivel of the second bearing assembly is connected to the intermediate pipe,
an outlet pipe connected to the main body of the second bearing assembly and having a reversely turned elbow to which an angled water outlet nozzle is connected,
wherein the first bearing assembly has a first actuator to move the main body relative to the inlet pipe, and wherein a second actuator is provided to move the main body of the second bearing assembly relative to the intermediate pipe.

13. The hydraulic water cannon according to claim 12, which can be operated at water pressures greater than 10 bar.

14. The hydraulic water cannon according to claim 13, wherein the operating water pressure is greater than 40 bar.

15. The hydraulic water cannon according to claim 14, wherein the operating water pressure is greater than 70 bar.

16. The hydraulic water cannon according to claim 12, wherein the first actuator is an electric actuator.

17. The hydraulic water cannon according to claim 12, wherein either or both of the first actuator and the second actuator is a hydraulic actuator.

18. The hydraulic water cannon according to claim 17, wherein a hydraulic fluid delivery system including at least one electrically driven hydraulic pump is connected to the first and second hydraulic actuators.

19. A bearing assembly for mounting a first pipe that is moveable relative to a second pipe in a fluid delivery system, the bearing assembly comprising:
a unitary main body adapted to be securely connected to an end of the first pipe and having a central opening for flow of fluid there-through in the fluid delivery system, the main body having a central recess around the central opening and a radially extending annular face surrounding the central recess with a coaxial seat on the annular face that receives a first thrust ring;
an annular centre swivel adapted to be securely connected to an end of the second pipe and having a generally cylindrical part to be received within the central recess of the main body for flow of fluid there-through in the fluid delivery system and a circumferential flange that presents a first radially extending face having a coaxial seat to engage the first thrust ring and a second, opposite radially extending face having a second coaxial seat that receives a second thrust ring, the centre swivel further including an annular, axially extending boss that extends away from the main body for secure connection to the end of the second pipe, wherein the second radially extending face extending radially outwardly from the boss; and
a bearing end cap adapted to engage around the second pipe and adapted to be bolted to the main body securing there-between the centre swivel and the thrust rings, the end cap having a seat for the second thrust ring;
wherein an internal diameter of the generally cylindrical part of the annular centre swivel received within the central recess of the main body axially aligns with and essentially matches a diameter of the central opening in the main body, and wherein the main body has a coaxial transverse recess formed as an annular slot around the central recess to receive an annular first seal member arranged to seal against a cylindrical outer surface of the generally cylindrical part of the centre swivel within the central recess, wherein the annular first seal member comprises: a glide seal which abuts the cylindrical outer surface of the generally cylindrical part of the centre swivel within the central recess, and an O-ring energiser which sits in the coaxial transverse recess covered by the glide seal, wherein the bearing assembly is designed for operation at fluid pressures greater than 10 bar.

20. The bearing assembly according to claim 19, wherein the central recess provides a shoulder or flange surrounding the central opening through the main body, and wherein an end face of the generally cylindrical part of the annular centre swivel is located opposite the shoulder or flange surrounding the central opening within the central recess of the main body.

21. A fluid delivery system comprising the bearing assembly according to claim 19.

22. A water cannon comprising:
   a water inlet pipe adapted to be connected to a water supply,
   a first bearing assembly, being a bearing assembly according to claim 19, wherein the boss of the centre swivel of the first bearing assembly is connected to the inlet pipe,
   an intermediate pipe connected to the main body of the first bearing assembly, the intermediate pipe section having a right angle elbow,
   a second bearing assembly, being another bearing assembly according to claim 19, wherein the boss of the centre swivel of the second bearing assembly is connected to the intermediate pipe, and
   an outlet pipe connected to the main body of the second bearing assembly and having a reversely turned elbow to which an angled water outlet nozzle is connected,
   wherein the first bearing assembly includes a first actuator to move the main body of the first bearing assembly relative to the inlet pipe, and the second bearing assembly includes a second actuator to move the main body of the second bearing assembly relative to the intermediate pipe.

* * * * *